US007652447B2

(12) United States Patent
Ward et al.

(10) Patent No.: US 7,652,447 B2
(45) Date of Patent: Jan. 26, 2010

(54) POWER CAPACITORS FOR AC MOTORS MOUNTED DIAMETRICALLY ON ASSOCIATED TRANSMISSIONS

(75) Inventors: Terence G. Ward, Redondo Beach, CA (US); Alex Thompson, Fullerton, CA (US); Brian A Welchko, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/625,929

(22) Filed: Jan. 23, 2007

(65) Prior Publication Data

US 2008/0174261 A1 Jul. 24, 2008

(51) Int. Cl.
*H02P 1/16* (2006.01)
(52) U.S. Cl. .................. 318/778; 361/502
(58) Field of Classification Search .......... 318/778, 318/72, 78, 662, 751, 794, 796, 817; 62/259.2, 62/228.4; 310/72; 123/179.25, 197.1, 597, 123/600; 180/291, 65.1; 323/370, 242; 903/952; 361/502, 301.1; 257/924
See application file for complete search history.

(56) References Cited

U.S. PATENT DOCUMENTS

| | | | |
|---|---|---|---|
| 4,400,140 A | 8/1983 | Papst | |
| 5,361,650 A | 11/1994 | Klecker et al. | |
| 5,517,401 A * | 5/1996 | Kinoshita et al. | 363/98 |
| 5,548,169 A * | 8/1996 | Iwasa et al. | 310/72 |
| 5,744,895 A | 4/1998 | Seguchi et al. | |
| 5,878,630 A | 3/1999 | Fessler et al. | |
| 6,031,751 A | 2/2000 | Janko | |
| 6,083,138 A * | 7/2000 | Aoyama et al. | 477/5 |
| 6,149,544 A * | 11/2000 | Masberg et al. | 477/13 |
| 6,327,137 B1 * | 12/2001 | Yamamoto et al. | 361/517 |
| 6,484,832 B1 * | 11/2002 | Morisawa et al. | 180/65.225 |
| 6,488,608 B2 * | 12/2002 | Yamaguchi et al. | 477/3 |
| 6,530,856 B1 | 3/2003 | Kakiage | |
| 6,541,942 B1 * | 4/2003 | Francis | 320/166 |
| 6,638,193 B2 * | 10/2003 | Hamai | 475/5 |
| 6,720,689 B2 | 4/2004 | Agnes et al. | |
| 6,817,432 B2 * | 11/2004 | Kitada et al. | 180/65.245 |
| 7,143,851 B2 * | 12/2006 | Masterson | 180/65.2 |
| 7,197,383 B2 * | 3/2007 | Tobler et al. | 701/22 |
| 7,210,304 B2 * | 5/2007 | Nagashima et al. | 62/259.2 |
| 7,322,896 B2 * | 1/2008 | Minagawa | 475/5 |
| 7,326,141 B2 | 2/2008 | Lyons et al. | |
| 7,412,310 B2 * | 8/2008 | Brigham et al. | 701/22 |
| 7,426,854 B2 * | 9/2008 | Endo et al. | 73/115.02 |
| 2004/0124332 A1 * | 7/2004 | Takenaka et al. | 248/648 |
| 2004/0195016 A1 * | 10/2004 | Shimizu et al. | 180/65.1 |
| 2005/0282675 A1 * | 12/2005 | Oliver | 475/5 |
| 2006/0087181 A1 | 4/2006 | Kusumi | |
| 2006/0142117 A1 * | 6/2006 | Colvin et al. | 477/107 |

(Continued)

OTHER PUBLICATIONS

Mullins, B.S. USPTO Office Action mailed on Jun. 4, 2009, for U.S. Appl. No. 11/668,734, filed on Jan. 30, 2007.

(Continued)

*Primary Examiner*—Bentsu Ro
*Assistant Examiner*—Antony M Paul

(57) ABSTRACT

Power capacitors for AC motors are mounted diametrically on associated transmissions. The power capacitors are in one embodiment annular and in another embodiment, arcuate. By having power capacitors mounted on transmission housings diametrically, cooling of the power capacitors is facilitated for both air and liquid cooling.

20 Claims, 3 Drawing Sheets

U.S. PATENT DOCUMENTS

| | | | |
|---|---|---|---|
| 2006/0154771 A1* | 7/2006 | Klemen et al. | 475/5 |
| 2006/0293144 A1* | 12/2006 | Nishina et al. | 477/5 |
| 2007/0007939 A1* | 1/2007 | Miller et al. | 323/299 |
| 2007/0049441 A1* | 3/2007 | Schmidt | 475/5 |
| 2007/0103951 A1* | 5/2007 | Ishikawa et al. | 363/146 |
| 2007/0157899 A1* | 7/2007 | Seufert et al. | 123/179.25 |
| 2007/0215316 A1* | 9/2007 | Saito et al. | 165/41 |
| 2007/0261901 A1* | 11/2007 | Janson et al. | 180/65.2 |
| 2007/0265128 A1* | 11/2007 | Conlon | 475/5 |
| 2007/0273223 A1* | 11/2007 | Ward et al. | 310/72 |
| 2008/0180000 A1 | 7/2008 | Ward et al. | |

OTHER PUBLICATIONS

Nguyen, H.N., USPTO Office Action mailed on Oct. 22, 2008, for U.S. Appl. No. 11/440,848, filed on May 25, 2006.

Nguyen, H.N. USPTO Office Action mailed on May 14, 2008, for U.S. Appl. No. 11/440,848, filed on May 25, 2006.

Walters, J.R., Response to Office Action mailed on May 14, 2008, Jul. 10, 2008.

* cited by examiner

POWER CAPACITORS FOR AC MOTORS MOUNTED DIAMETRICALLY ON ASSOCIATED TRANSMISSIONS

FIELD OF THE INVENTION

The present invention is directed to power capacitors for AC motors mounted diametrically on associated transmissions. More particularly, the present invention relates to power capacitors for AC motors mounted diametrically on associated transmissions used to drive automotive vehicles.

BACKGROUND OF THE INVENTION

In configuring automotive vehicles, efficient use of space is an important consideration. This is because various components of automotive vehicles frequently compete for space within the envelope defined by vehicle bodies. The judicious use of space is a consideration not only during assembly of automotive vehicles, but also during maintenance of vehicles. In addition, consuming less space for essential automotive components allows the designer to increase space for optional components and for cabin capacity. While adjusting or decreasing space consumption of one component may not appear to have substantial design effects, cumulative space adjustments and decreased space consumption for several components can result in more efficient use of total space within a vehicle and enhanced design flexibility.

In voltage source inverter arrangements, capacitors are used as energy storage devices providing power buffers to maintain relatively smooth dc link voltages. Typically, capacitance volume accounts for a significant portion of the total volume required by voltage source inverter packaging. Such capacitors are frequently electrolytic or film capacitors. These capacitors are manufactured by winding a thin film to increase the total amount surface area of the film. In the prior art, such capacitors are usually wound tightly around their center to produce enclosed or solid cylinders of different heights and diameters.

In order to reduce loses and EMI, which results from the transmission of power between an electric drive (inverters and capacitors) and an electric motor, it is often desirable to minimize transmission distance between electric drives and motors. In order to minimize distance, the electric drive can be integrated into a common package with a motor. In many hybrid vehicles, the motor(s) are integrated into the mechanical transmission (or gearbox) of the vehicle. Hence, one such embodiment of the system could incorporate the inverter in a container attached externally to the transmission housing so that it is located in close proximity to the electric motor.

A drawback to attaching the electric drive in its enclosed container to the outside of the transmission is the difficulty in packaging the volume of the inverter into the space and form factor allotted. Since the capacitance required by the electric drive comprises a significant volume of the electric drive relocating the capacitance will decrease the volume of the remaining drive components, and thus make the system much simpler to package.

SUMMARY OF THE INVENTION

An alternating current electric motor drive assembly comprises an AC electric motor with an output shaft coupled to a transmission, wherein the transmission has a power capacitor diametrically mounted thereon and electrically connected to windings of the motor.

In one aspect of the drive assembly, the power capacitor is annular.

In another aspect of the drive assembly, the power capacitor is arcuate with a gap between ends of the power capacitor.

In another aspect of the drive assembly, the motor is a traction motor for an automotive vehicle.

In still another aspect, the power capacitor is cooled by circulating liquid which transfers heat from the power capacitor to a radiator or is cooled by air flowing over the power capacitor.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
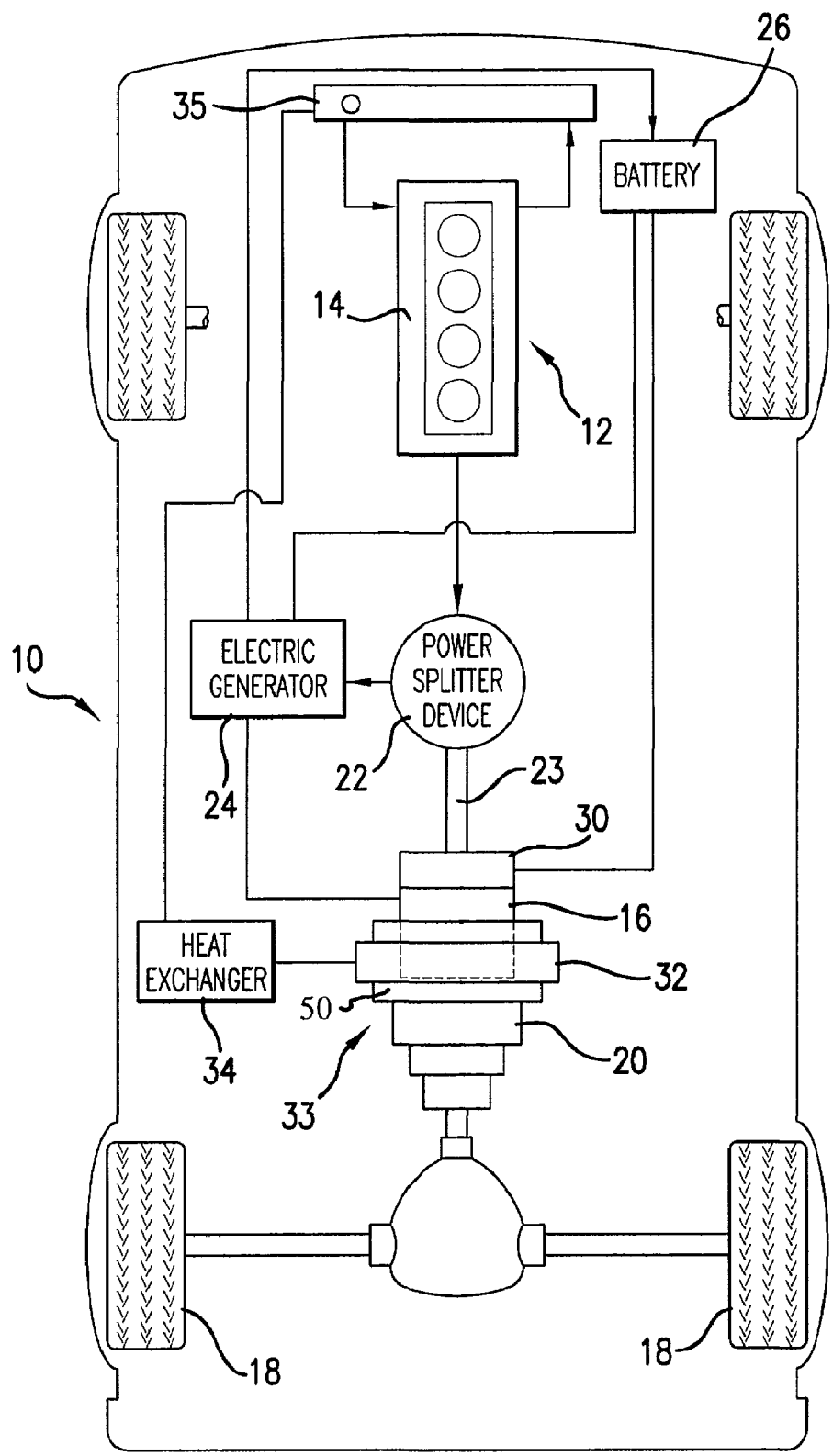
FIG. 1 is a schematic view of a hybrid automotive vehicle utilizing an AC electric traction motor having power capacitor diametrically mounted on an associated transmission.

Referring now to FIG. 1 there is shown a vehicle 10 with a hybrid drive 12 comprising an internal combustion engine 14 and an alternating current (AC) motor 16. The internal combustion engine 14 and AC motor 16 drive wheels 18 through a transmission 20, which is integral with the AC motor. A power splitter 22 connected to the IC engine 14 via a shaft 23 drives an electric generator 24 to charge a battery 26 (which may be configured as a bank of batteries) when the internal combustion engine 14 is running. The electric generator 24 can under selected circumstances power the electric motor 16 to run simultaneously with the internal combustion engine 14. The battery 26 and the electric generator 24 deliver DC current to an inverter 30 that is illustrated as axially mounted and integral with the AC motor 16. According to the present invention, a power capacitor 32 is mounted on the transmission 20. Preferably, the power capacitor 32 is diametrically mounted on the transmission 20 to form a drive assembly 33 comprised of the AC motor 16, the transmission 20, the inverter 30 and the capacitor 32. The term "diametrically mounted" means mounted around the diameter of the transmission. By positioning the power capacitor 32 on the transmission 20 diametrically, the power capacitor is available for air cooling or water/glycol cooling utilizing a heat exchanger 34 coupled to the vehicle radiator 35 which cools the IC engine 14. In an alternative embodiment, the motor 16 also serves ad the generator.

Figure 2:
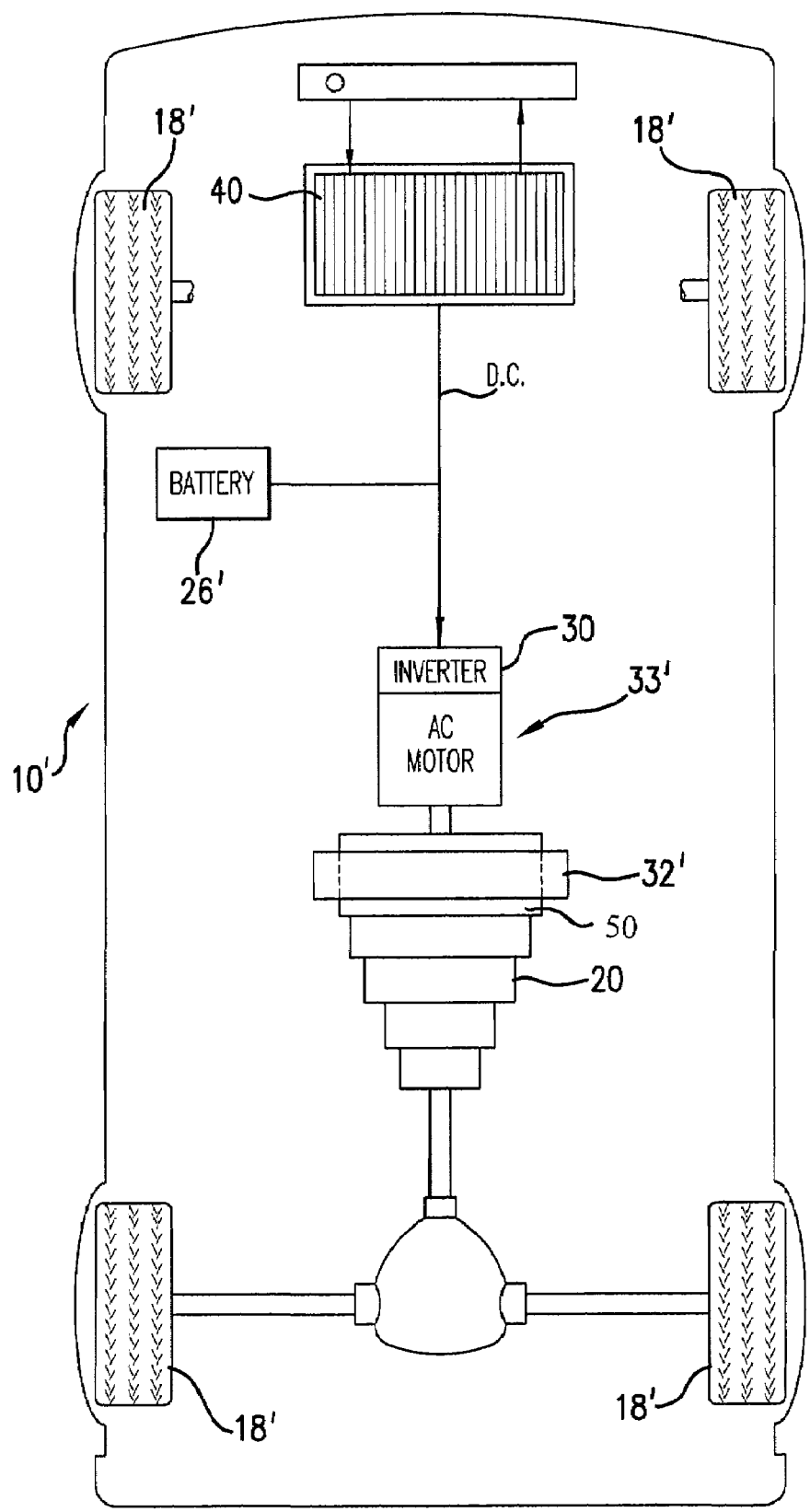
FIG. 2 is a schematic illustration of a fuel cell powered vehicle having an AC electric tractor motor driving the vehicle through a transmission having a power capacitor diametrically mounted thereon.
Figure 3:
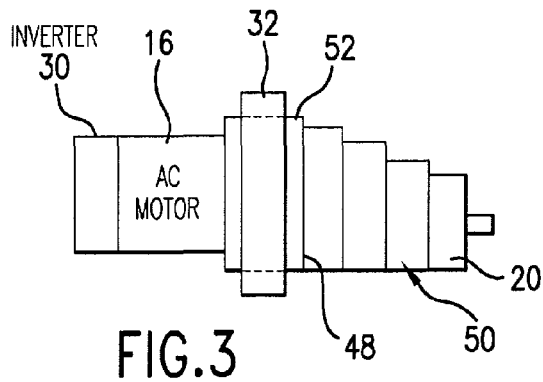
FIG. 3 is a side view of a motor-transmission combination of FIGS. 1 and 2 with an annular power capacitor diametrically mounted thereon in accordance with a first embodiment of the invention.
Figure 4:
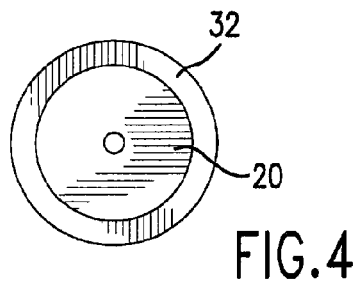
FIG. 4 is a front view of FIG. 3.

Referring now to FIG. 2, FIG. 2 is similar to FIG. 1 with the exception that the vehicle 10' is powered by a fuel cell 40 that both charges the battery 26 and provides direct current to the inverter 30 of the drive assembly 33'. The drive assembly 33' is configured similarly to the drive assembly 33 of FIG. 1, wherein an axial mounted inverter 30 converts direct current from the fuel cell 40 into AC and wherein the power capacitor 32' is mounted diametrically on the transmission 20. The motor 16 is preferably integral with the transmission 20 and disposed within a housing enclosing the transmission. As in FIG. 1, the power capacitor 32 is air or liquid cooled.

Figure 5:
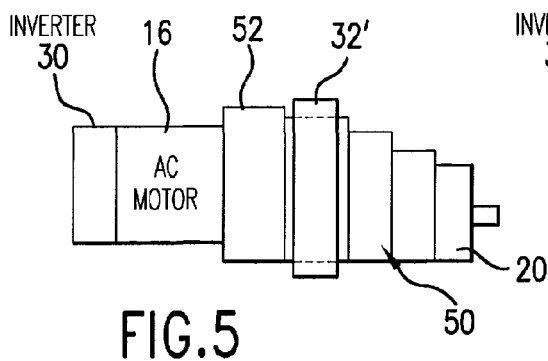
FIG. 5 is a side view of a motor-transmission combination having a capacitor on the transmission at another location.
Figure 6:
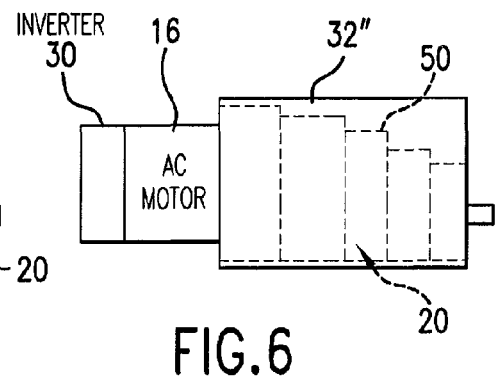
FIG. 6 is a side view of a motor-transmission combination having a capacitor of increased axial length mounted diametrically thereon.

Referring now to FIGS. 3-6 in which a first embodiment of the invention is shown, the power capacitor 32 is configured an annular capacitor that is mounted around the housing 50 of the transmission 20. Preferably, the annular power capacitor 32 is on the first stage 52 in close axial relation to the motor 16. As is seen in FIG. 5, the annular power capacitor 32' may be mounted around any convenient diameter of the transmission housing 50. As is seen in FIG. 6, the capacitor 32' may be as long as the transmission 20, and in further embodiments, not illustrated, the capacitor 32' may occupy any portion of the axial length of the transmission or may be packaged such that it is longer than the transmission 20.

Figure 7:
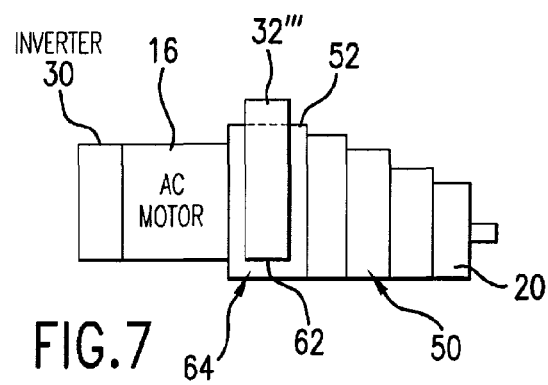
FIG. 7 is a side view of a transmission with an arcuate power capacitor mounted diametrically thereon in accordance with another embodiment of the present invention.
Figure 8:
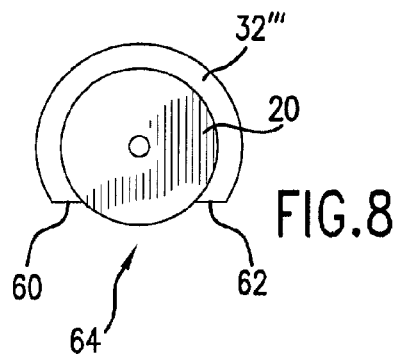
FIG. 8 is a front view of FIG. 7.

As is seen in FIGS. 7 and 8, where a second embodiment 32'" of the capacitor is shown, the capacitor 32'" is arcuate having ends 60 and 62 separated by a gap 64. Preferably, in this embodiment the capacitor 32'" is oriented so that the gap 64 is at the bottom of the transmission housing 50, however in further embodiments, the gap 64 may be oriented at the top of the transmission housing 50 or laterally with respect to the transmission housing. The power capacitor 32'" in the illustrated configuration has an arcuate extent of 270°, but may have other arcuate extents. The capacitor 32" is shown with a single circular extent, but the capacitor may be divided into a plurality of arcuate sections.

By packaging the capacitors 32, 32', 32" and 32'" is illustrated in FIGS. 3-8, the amount of capacitance may be increased as a result of the large surface area available. Accordingly, the reliability of the entire drive systems 33-33'" is increased. Since the voltage of the capacitors 32-32'" is substantially DC, the capacitors themselves may serve as a shield against undesirable electromagnetic interference.

Placing the capacitors 32-32'" on the outer surfaces of the transmission housings 50, rather than inside the transmission housings, facilitates cooling of the capacitors by either air cooling arrangements, or by cooling with water/glycol circulated directly through a radiator 35 or through a heat exchanger 34 as shown in FIGS. 1 and 2.

Internal temperatures of transmissions 20 can exceed capacitor ratings. By arranging power capacitors 32-33'" as illustrated, the capacitors have a large surface area to volume ratio which allows the capacitors to more easily reject heat and to operate in a lower temperature environment. Cooler capacitor temperatures reduce capacitance derating due to temperature. In addition, improved EMI shielding may result by placing the power capacitor diametrically around the transmission housing 50.

Placing the capacitors 32-33'" on the outside diameter of the transmission housing 50 provides a very large surface area within the capacitor, resulting in a large capacitance value. Inverter/AC motor systems with large bulk capacitance, as provided by the arrangements of FIGS. 3-8, have enhanced reliability, reducing the need for other filtering components and resulting in cost and space savings.

By positioning the capacitors 32-32'" as illustrated in FIGS. 3-8, available space within the body of a vehicle may be utilized more efficiently making it easier to package other components such as the inverter 30 in the vehicle.

From the foregoing description, one skilled in the art can easily ascertain the essential characteristics of this invention, and without departing form the spirit and scope thereof, can make various changes and modifications of the invention to adapt it to various usages and conditions.

The invention claimed is:

1. A drive assembly for a vehicle comprising:
   a transmission;
   a housing enclosing the transmission, the housing having a proximal end and a distal end;
   a AC electric traction motor coupled to the transmission, wherein the AC electric traction motor is integral with the transmission;
   an inverter axially mounted and integral with the AC electric traction motor; and
   a power capacitor diametrically mounted around an outer surface of the housing of the transmission, the power capacitor being disposed at the proximal end of the housing and adjacent the AC electric traction motor such that the power capacitor is in close axial relation to the AC electric traction motor, wherein the power capacitor is mounted around a diameter of the transmission.

2. The drive assembly of claim 1, wherein the transmission includes a first stage adjacent to the AC electric traction motor, wherein the power capacitor is mounted around a diameter of the first stage.

3. The drive assembly of claim 1, wherein the AC electric traction motor is disposed within the housing.

4. The drive assembly of claim 1, wherein the power capacitor extends at least from the proximal end of the transmission to the distal end of the transmission, the proximal end of the transmission being adjacent to the AC electric traction motor.

5. The drive assembly of claim 4, wherein the power capacitor has a large surface area to volume ratio.

6. The drive assembly of claim 1, wherein the power capacitor is electrically connected to an electric drive unit of the AC traction motor and configured as a power buffer to maintain a relatively smooth DC link voltage.

7. The drive assembly of claim 6, further comprising a battery that delivers DC current to the inverter.

8. The drive assembly of claim 6, further comprising a fuel cell that provides DC current to the inverter.

9. The drive assembly of claim 1, wherein the power capacitor is arcuate and has first and second ends separated by a gap.

10. The drive assembly of claim 9, wherein the power capacitor is positioned on the housing with the gap facing downwardly.

11. The drive assembly of claim 10, wherein the power capacitor has an arcuate length of about 270°.

12. The drive assembly of claim 1, wherein the power capacitor comprises a plurality of arcuate sections.

13. The drive assembly of claim 1, wherein the AC electric traction motor drives wheels of the vehicle through the transmission.

14. The drive assembly of claim 11, further comprising an internal combustion engine that drives wheels of the vehicle through the transmission.

15. The drive assembly of claim 1, wherein the AC electric traction motor has an output shaft coupled to the transmission.

16. The drive assembly of claim 1, wherein the power capacitor is air cooled.

17. The drive assembly of claim 1, wherein the power capacitor is annular.

18. The drive assembly of claim 1, wherein the power capacitor is liquid cooled and further including a heat exchanger connected to the power capacitor to remove heat from liquid cooling the power capacitor.

19. The drive assembly for a vehicle comprising:
a transmission;
a housing enclosing the transmission;
an AC electric traction motor coupled to the transmission and adjacent to a first stage of the transmission, wherein the AC electric traction motor is integral with the transmission and disposed within the housing;
an inverter axially mounted and integral with the AC electric traction motor; and
a power capacitor diametrically mounted around an outer surface of the housing of the transmission, wherein the power capacitor is mounted around a diameter of the first stage such the power capacitor is in close axial relation to the AC electric traction motor.

20. A drive assembly for a vehicle comprising:
a transmission;
a housing enclosing the transmission;
an AC electric traction motor coupled to the transmission and adjacent to a first stage of the transmission, wherein the AC electric traction motor is integral with the transmission and disposed within the housing;
an inverter axially mounted and integral with the AC electric traction motor; and
a power capacitor diametrically mounted around an outer surface of the housing of the transmission around a diameter of the first stage such that the power capacitor is in close axial relation to the AC electric traction motor, wherein:
the power capacitor is arcuate and has first and second ends separated by a gap; and
the power capacitor is electrically connected to an electric drive unit of the AC electric traction motor and configured as a power buffer to maintain a relatively smooth DC link voltage.

\* \* \* \* \*